United States Patent
Hartnagel et al.

[11] Patent Number: 6,131,615
[45] Date of Patent: Oct. 17, 2000

[54] TUBE ASSEMBLY FOR AUXILIARY HEATING AND AIR CONDITIONING SYSTEM

[75] Inventors: Philip S. Hartnagel, Rochester; Kurian Pothen, Bloomfield Hells; Matthew Mourad, Oxford; Charles D. Thrift, Farmington Hills, all of Mich.

[73] Assignees: Bundy corporation, Warren; Chrysler Corporation, Auburn Hills, both of Mich.

[21] Appl. No.: 09/442,586

[22] Filed: Nov. 18, 1999

Related U.S. Application Data

[63] Continuation-in-part of application No. 08/960,788, Oct. 30, 1997, Pat. No. 6,009,908.

[51] Int. Cl.[7] ........................................ F16L 9/18
[52] U.S. Cl. .................. 138/113; 138/114; 138/109; 285/123.1
[58] Field of Search ............................ 138/111–114, 108, 138/109; 285/123.1; 165/154

[56] References Cited

U.S. PATENT DOCUMENTS

| | | | |
|---|---|---|---|
| 1,824,717 | 9/1931 | Harty et al. | 138/113 X |
| 3,786,379 | 1/1974 | Lutchansky | 138/113 X |
| 4,448,243 | 5/1984 | Pain | 165/134.1 |
| 4,451,966 | 6/1984 | Lee | 138/114 X |
| 4,475,584 | 10/1984 | Martin et al. | 165/76 |
| 4,585,059 | 4/1986 | Lee | 138/114 X |
| 4,886,305 | 12/1989 | Martin | 138/113 X |
| 4,896,701 | 1/1990 | Young | 138/108 |
| 4,906,496 | 3/1990 | Hosono et al. | 138/113 X |
| 5,076,242 | 12/1991 | Parker | 138/114 X |
| 5,097,898 | 3/1992 | Verkaart | 165/154 |
| 5,423,353 | 6/1995 | Sorensen | 138/113 X |
| 5,433,252 | 7/1995 | Wolf et al. | 138/114 X |
| 5,449,204 | 9/1995 | Greene et al. | 138/113 X |
| 5,456,502 | 10/1995 | Sharp | 138/114 X |
| 5,611,373 | 3/1997 | Ashcraft | 138/113 |

*Primary Examiner*—Patrick Brinson
*Attorney, Agent, or Firm*—McEachran, Jambor, Keating, Bock & Kurtz

[57] ABSTRACT

A tube assembly for an auxiliary heating and air conditioning system includes an inner tube extending longitudinally, an outer tube extending longitudinally and disposed over the inner tube, the outer tube including a plurality of ribs for locating the inner tube approximately concentric to the outer tube, at least one connector tube, and at least one connector interconnecting the at least one connector tube and the outer tube to allow fluid flow between the inner tube and the outer tube.

10 Claims, 2 Drawing Sheets

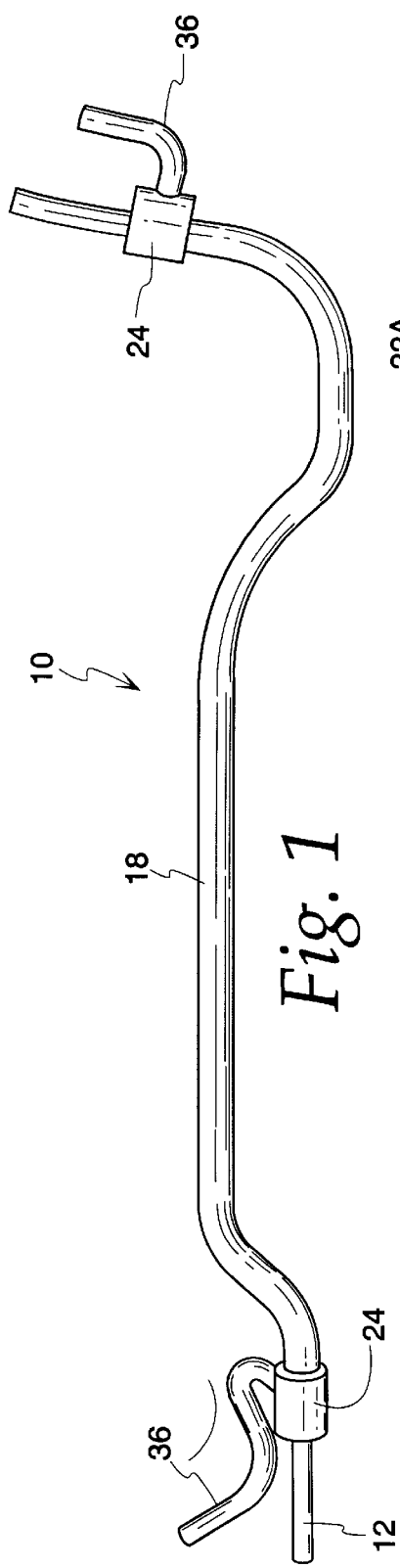
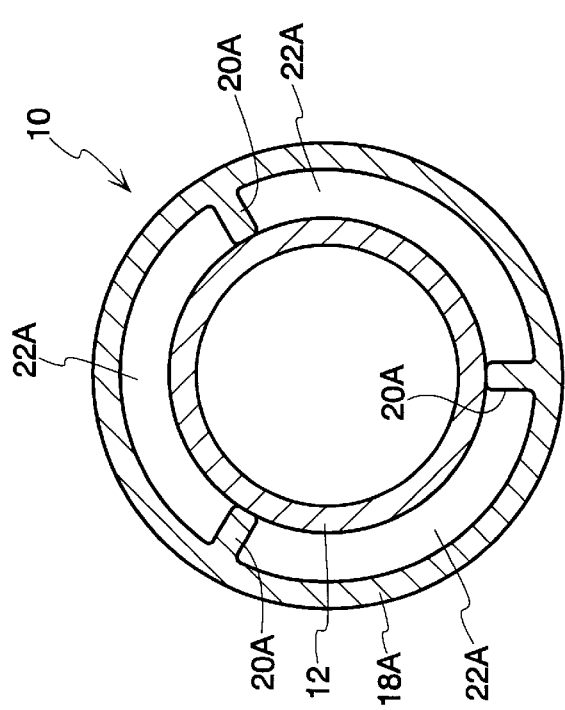
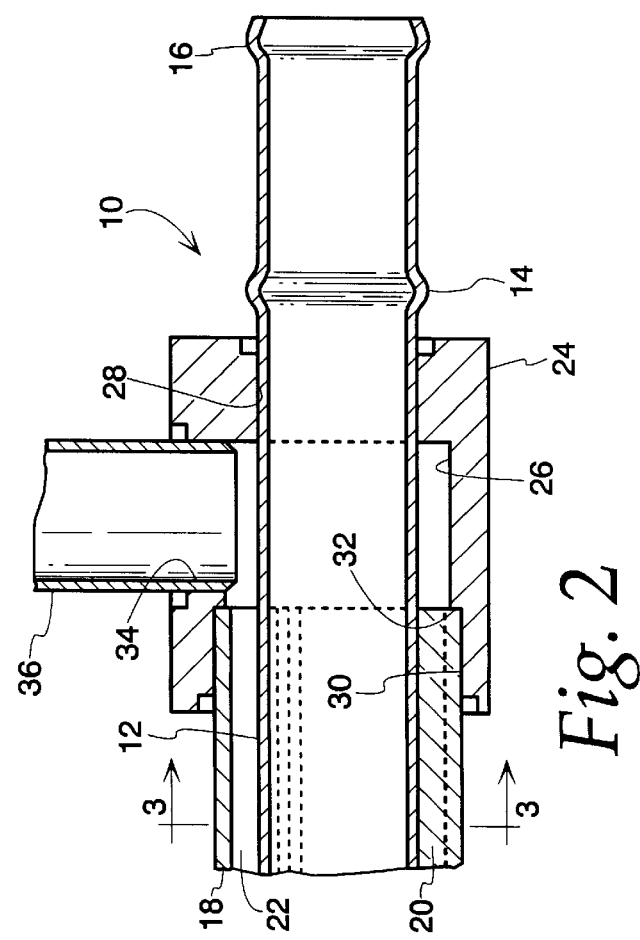

TUBE ASSEMBLY FOR AUXILIARY HEATING AND AIR CONDITIONING SYSTEM

This application is a continuation-in-part of application Ser. No. 08/960,788 filed Oct. 30, 1997, now U.S. Pat. No. 6,009,908.

BACKGROUND OF THE INVENTION

1. Field of the Invention

The present invention relates generally, to heating and air conditioning systems and, more particularly, to a tube assembly for an auxiliary heating and air conditioning system of a motor vehicle.

2. Description of the Related Art

Motor vehicles typically include a heating and air conditioning system for heating and cooling of an occupant compartment of the motor vehicle. Often, these heating and air conditioning systems include an auxiliary heating and air conditioning system. Typically, a fluid supply line extends from a main heating and air conditioning system to the auxiliary heating and air conditioning system and a fluid return line extends from the auxiliary heating and air conditioning system to the main heating and air conditioning system.

One disadvantage of the above is that separate lines are needed for supply and return of fluid which creates a packaging problem. Another disadvantage of the above is that there is no heat exchange between the supply and return lines. Thus, there is a need in the art to provide a new and improved tube assembly for the auxiliary heating and air conditioning system.

SUMMARY OF THE INVENTION

It is, therefore, one object of the present invention to provide a tube assembly for an auxiliary heating and air conditioning system of a motor vehicle.

It is another object of the present invention to improve the packaging and performance of an auxiliary heating and air conditioning system for a motor vehicle.

To achieve the foregoing objects, the present invention is a tube assembly for an auxiliary heating and air conditioning system of a motor vehicle. The tube assembly includes an inner tube extending longitudinally and an outer tube extending longitudinally and disposed over the inner tube. The outer tube includes a plurality of ribs for locating the inner tube approximately concentric to the outer tube. The tube assembly includes at least one connector tube and at least one connector interconnecting the at least one connector tube and the outer tube to allow fluid flow between the inner tube and outer tube.

One advantage of the present invention is that a new and improved tube assembly for an auxiliary heating and air conditioning system is provided on a motor vehicle. Another advantage of the present invention is that the tube assembly improves packaging and performance of an auxiliary heating and air conditioning system. Yet another advantage of the present invention is that the tube assembly incorporates a concentric tube design for better packaging, performance and weight.

Other objects, features and advantages of the present invention will be readily appreciated as the same becomes better understood after reading the subsequent description when considered in connection with the accompanying drawings.

BRIEF DESCRIPTION OF THE DRAWINGS

FIG. 1 is an elevational view of a tube assembly, according to the present invention, for an auxiliary heating and air conditioning system.

FIG. 2 is a fragmentary elevational view of the tube assembly of FIG. 1.

FIG. 3 is a sectional view of a first embodiment of the outer tube taken along line 3—3 of FIG. 2.

DESCRIPTION OF THE PREFERRED EMBODIMENTS

Figure 4:
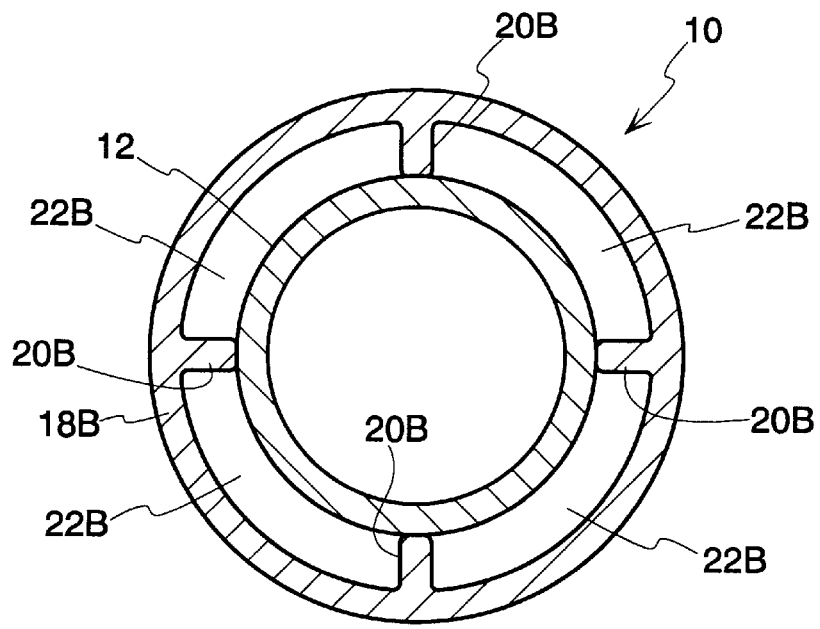
FIG. 4 is a sectional view of a second embodiment of the outer tube taken along line 3—3 of FIG. 2.

Referring to FIGS. 1 through 3, a tube assembly 10, according to the present invention, is shown for an auxiliary heating and air conditioning system (not shown) of a motor vehicle (not shown). The tube assembly 10 includes an inner tube 12 extending longitudinally to supply fluid such as water from a front or main heating and air conditioning system (not shown) to the rear or auxiliary heating and air conditioning system. The inner tube 12 is hollow and has a generally circular cross-sectional shape. The inner tube 12 may have bead 14 and a radially expanded end 16 for connection to a hose (not shown). The inner tube 12 is made of a rigid material such as a metal material.

The tube assembly 10 also includes an outer tube 18 extending longitudinally and disposed over the inner tube 12. The outer tube 18 is hollow and has a generally circular cross-sectional shape and also has the same cross sectional area as the inner tube 12. The outer tube 18 includes a plurality of ribs 20 extending radially inwardly and longitudinally to locate or center the inner tube 12 relative to the outer tube 18 such that they are approximately concentric. The ribs 20 also divide the interior of the outer tube 18 into a plurality of channels 22 to allow fluid flow longitudinally between the outer tube 18 and inner tube 12.

A first embodiment of the outer tube 18 is illustrated in FIG. 3. The outer tube 18A has three ribs 20A dividing the interior of the outer tube into three channels 22B. The three ribs 20A are provided approximately one hundred twenty degrees apart to provide the three channels 22A.

To provide additional reliability or durability to the tube assembly, a second embodiment of the outer tube 18B, as illustrated in FIG. 4, has four ribs 20B dividing the interior of the outer tube into four channels 22B. The four ribs 20B are provided approximately ninety degrees apart to provide the four channels 22B.

Figure 5:
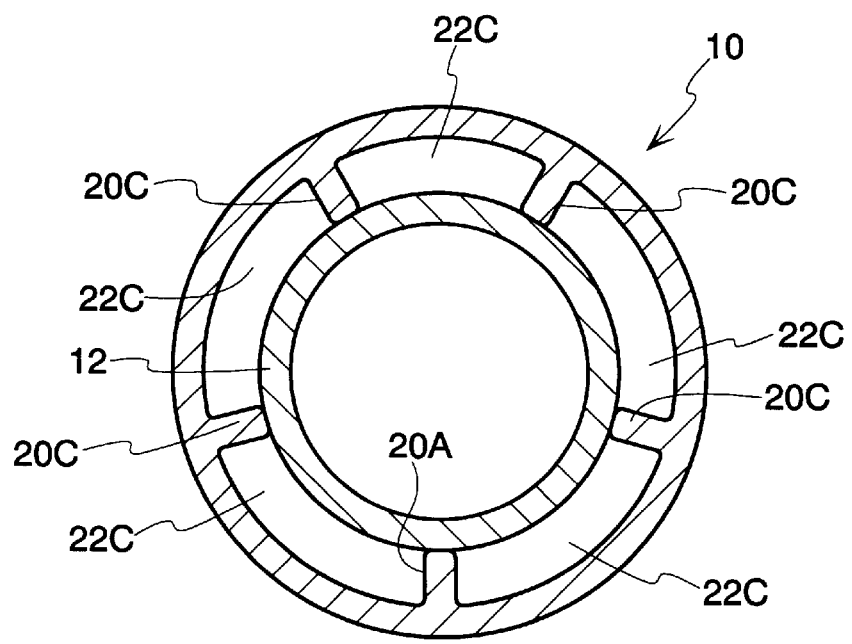
FIG. 5 is a sectional view of a third embodiment of the outer tube taken along line 3—3 of FIG. 2.

To provide further additional reliability or durability to the tube assembly, a third embodiment of the outer tubing 18C, as illustrated in FIG. 5, has five ribs 20C dividing the interior of the outer tube into five channels 22C. The five ribs 20C are provided approximately seventy two degrees apart to provide the five channels 22C.

The outer tube 18 is made of a rigid material such as a metal material.

The tube assembly 10 includes at least one, preferably a plurality of connectors 24. Each connector 24 is generally cylindrical in shape and has a cavity 26 in one longitudinal end thereof and a first passageway 28 extending through the first other longitudinal end and communicating with the cavity 26. The inner tube 12 extends through the first passageway 28 and cavity 26 and the bead 14 prevents the connector 24 from exiting the end of the inner tube 12.

Each connector 24 also includes a radially enlarged opening 30 at one end of the cavity 26 to receive the outer tube 18. The enlarged opening 30 forms a shoulder 32 with the cavity 26 which acts as a stop to locate the outer tube 18 within the connector 24. It should be appreciated that the outer tube 18 is press-fit into the connector 24.

Each connector 24 further includes a second passageway 34 in one side of the connector 24 and communicating with the cavity 26. Preferably, the second passageway 34 is generally perpendicular or radial to the first passageway 28.

The tube assembly 10 also includes a connector tube 36 connected to each connector 24 to return fluid such as water from the rear or auxiliary heating and air conditioning system to the front or main heating and air conditioning system. The connector tube 36 is hollow and has a generally circular cross-sectional shape. The connector tube 36 has one end disposed in the second passageway 34 of the connector 24 and preferably press-fit therein. The connector tube 36 is made of a relatively rigid material such as a metal material.

In operation, fluid such as water flows from the front or main heating and air conditioning system through the inner tube 12 to the rear or auxiliary heating and air conditioning system. Simultaneously, fluid such as water flows from the rear or auxiliary heating and air conditioning system through the connector tube 36 at one end to the cavity 26 of the connector 24 and along the channels 22 between the outer tube 18 and inner tube 12 to the cavity 26 of the other connector 24 and through the other connector tube 36 to the front or main heating and air conditioning system. It should be appreciated that heat transfer occurs between the fluid of the inner tube 12 and the fluid of the outer tube 18 if there is a temperature difference between the two.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tube assembly for a heating and air conditioning system comprising:

an inner tube extending longitudinally;

an outer tube extending longitudinally and disposed over said inner tube;

a connector tube;

a connector interconnecting said connector tube and said outer tube to allow fluid flow between said inner tube and said outer tube, said inner tube extending through said connector, wherein said inner tube includes a bead located longitudinally outwardly of said connector for preventing said connector from exiting said inner tube;

said outer tube including a plurality of ribs for locating said inner tube approximately concentric to said outer tube; and said ribs extending longitudinally and radially inwardly and are spaced approximately ninety degrees apart.

2. A tube assembly as set forth in claim 1 wherein said connector includes a cavity in one longitudinal end and a first passageway extending through another longitudinal end and communicating with said cavity.

3. A tube assembly as set forth in claim 2 wherein said connector includes a second passageway extending into and communicating with said cavity, said connector tube being disposed in said second passageway.

4. A tube assembly as set forth in claim 2 wherein said cavity includes a radially enlarged opening to receive said outer tube.

5. A tube assembly as set forth in claim 4 wherein said connector includes a shoulder between one end of said cavity and said enlarged opening to locate said outer tube within said connector.

6. A tube assembly for a heating and air conditioning system comprising:

an inner tube extending longitudinally;

an outer tube extending longitudinally and disposed over said inner tube;

a connector tube;

a connector interconnecting said connector tube and said outer tube to allow fluid flow between said inner tube and said outer tube, said inner tube extending through said connector, wherein said inner tube includes a bead located longitudinally outwardly of said connector for preventing said connector from exiting said inner tube;

said outer tube including a plurality of ribs for locating said inner tube approximately concentric to said outer tube; and said ribs extending longitudinally and radially inwardly and are spaced approximately seventy two degrees apart.

7. A tube assembly as set forth in claim 6 wherein said connector includes a cavity in one longitudinal end and a first passageway extending through another longitudinal end and communicating with said cavity.

8. A tube assembly as set forth in claim 7 wherein said connector includes a second passageway extending into and communicating with said cavity, said connector tube being disposed in said second passageway.

9. A tube assembly as set forth in claim 7 wherein said cavity includes a radially enlarged opening to receive said outer tube.

10. A tube assembly as set forth in claim 9 wherein said connector includes a shoulder between one end of said cavity and said enlarged opening to locate said outer tube within said connector.

* * * * *